US011860558B2

(12) United States Patent
Furukawa et al.

(10) Patent No.: US 11,860,558 B2
(45) Date of Patent: Jan. 2, 2024

(54) IMAGE FORMING APPARATUS

(71) Applicant: BROTHER KOGYO KABUSHIKI KAISHA, Nagoya (JP)

(72) Inventors: Masaaki Furukawa, Nagoya (JP); Sota Hirano, Kasugai (JP); Takahito Yamaji, Aisai (JP); Toshiyuki Sano, Iwakura (JP); Tadao Kyotani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/817,364

(22) Filed: Aug. 4, 2022

(65) Prior Publication Data

US 2023/0038853 A1 Feb. 9, 2023

(30) Foreign Application Priority Data

Aug. 5, 2021 (JP) ................................ 2021-129211

(51) Int. Cl.
*G03G 15/20* (2006.01)
*G03G 15/00* (2006.01)
*G03G 15/043* (2006.01)

(52) U.S. Cl.
CPC ....... *G03G 15/2039* (2013.01); *G03G 15/043* (2013.01); *G03G 15/5008* (2013.01); *G03G 15/5045* (2013.01); *G03G 15/6573* (2013.01); *G03G 15/757* (2013.01); *G03G 2215/00396* (2013.01); *G03G 2215/2045* (2013.01)

(58) Field of Classification Search
CPC ............ G03G 15/2039; G03G 15/043; G03G 15/5008; G03G 15/5045; G03G 15/6573; G03G 15/757; G03G 2215/00396; G03G 2215/2045
See application file for complete search history.

(56) References Cited

U.S. PATENT DOCUMENTS

2015/0277261 A1 10/2015 Suzuki
2016/0349664 A1 12/2016 Sawashima
(Continued)

FOREIGN PATENT DOCUMENTS

JP 2001-199610 A 7/2001
JP 2002-189322 A 7/2002
(Continued)

*Primary Examiner* — Victor Verbitsky
(74) *Attorney, Agent, or Firm* — Merchant & Gould P.C.

(57) ABSTRACT

An image forming apparatus is configured to execute image forming processing of forming an image on a sheet. The apparatus includes a photosensitive drum, a fixing device including a heater and a roller, a main motor configured to generate a driving force, a driving mechanism having a connected state in which the driving force is transmittable to both the roller and the photosensitive drum, and a disconnected state in which the driving force is transmittable to the roller but is not transmitted to the photosensitive drum, a temperature sensor configured to detect a temperature of the fixing device, and a controller. In a case where the image forming processing is started, the controller sets the driving mechanism into the disconnected state, rotates the main motor at a preheating speed, and executes preheating processing in which the fixing device is heated by the heater.

5 Claims, 7 Drawing Sheets

(56) References Cited

U.S. PATENT DOCUMENTS

| | | | |
|---|---|---|---|
| 2021/0356900 | A1 | 11/2021 | Nakamura et al. |
| 2022/0050411 | A1* | 2/2022 | Sugaya |

FOREIGN PATENT DOCUMENTS

| | | | |
|---|---|---|---|
| JP | 2002-268503 | A | 9/2002 |
| JP | 2015-191210 | A | 11/2015 |
| JP | 2016-224418 | A | 12/2016 |

* cited by examiner

IMAGE FORMING APPARATUS

REFERENCE TO RELATED APPLICATIONS

This application claims priority from Japanese Patent Application No. 2021-129211 filed on Aug. 5, 2021. The entire content of the priority application is incorporated herein by reference.

BACKGROUND ART

In the related art, in an image forming apparatus such as a laser printer, a toner image formed on a surface of a photosensitive drum is transferred to a sheet by a transfer roller, and then the toner image transferred to the sheet is fixed to the sheet by a fixing device.

Among such image forming apparatuses, there is one in which a plurality of members are driven by a motor. For example, Patent Literature 1 discloses an image forming apparatus in which three members, i. e., a photosensitive drum, a developing device, and a cleaning device, are driven by a single motor, and the driving of the members is switched by controlling a clutch.

DESCRIPTION

Here, in the image forming apparatus, when preheating a fixing device, only the fixing device needs to be rotated at a rotation speed suitable for preheating, and it is not necessary to rotate the photosensitive drum. When printing on a sheet, it is necessary to rotate both the fixing device and the photosensitive drum at a speed suitable for printing.

However, in the image forming apparatus of Patent Literature 1, since the driving of the photosensitive drum is not controlled in consideration of a change in a rotation speed of the motor as described above, the photosensitive drum may be deteriorated due to unnecessary rotation.

The present invention has been made to solve the above problems, and an object of the present invention is to provide an image forming apparatus in which a fixing device and a photosensitive drum may be rotated at respective optimum rotation speeds and deterioration of the photosensitive drum may be reduced.

According to an aspect of the present invention, there is provided an image forming apparatus capable of performing image forming processing of forming an image on a sheet, the image forming apparatus including: a photosensitive drum; a fixing device that includes a heater and a roller; a main motor; a driving mechanism that is capable of switching between a connected state in which a driving force of the main motor is transmittable to both the roller and the photosensitive drum, and a disconnected state in which the driving force of the main motor is transmittable to the roller but is not transmitted to the photosensitive drum; a temperature sensor that detects a temperature of the fixing device; and a controller.

In a case where the image forming processing is started, the controller sets the driving mechanism to the disconnected state, rotates the main motor at a preheating speed, and executes preheating processing that is processing of heating the fixing device to fixing temperature by the heater. The fixing temperature is suitable temperature for fixing a toner image on a sheet. In a case where the temperature of the fixing device detected by the temperature sensor reaches the fixing temperature after execution of the preheating processing, the controller executes acceleration processing of accelerating a rotation speed of the main motor to a printing speed that is a rotation speed higher than the preheating speed while maintaining the driving mechanism in the disconnected state. In a case where the rotation speed of the main motor reaches the printing speed after execution of the acceleration processing, the controller switches the driving mechanism from the disconnected state to the connected state, and executes photosensitive drum driving start processing of starting driving both the roller of the fixing device and the photosensitive drum.

According to the image forming apparatus having the above-described configuration, at the time of executing the preheating processing and the acceleration processing, the controller sets the driving mechanism in the disconnected state and drives the main motor. Thus, unnecessary rotation of the photosensitive drum may be reduced and deterioration of the photosensitive drum may be reduced.

In the image forming apparatus according to an aspect of the present invention, a laser scanner is further provided that includes a polygon mirror and a polygon motor that rotates the polygon mirror. In a case where the temperature of the fixing device is lower than a given temperature at a time of receiving a start command for image forming processing, the controller starts rotation of the polygon motor after starting rotation of the main motor, and increases a rotation speed of the polygon motor to an exposure speed that is a rotation speed of the polygon motor suitable for exposing the photosensitive drum. The given temperature is a temperature (for example, 150° C.) at which grease for smoothly sliding a fixing belt on a nip plate of a heating unit has an optimum viscosity, and lower than the fixing temperature.

According to the image forming apparatus having the above-described configuration, in a case where the temperature of the fixing device is lower than the given temperature, time required for the preheating processing of the fixing device is increased, and thus the controller starts the rotation of the main motor before starting the rotation of the polygon motor to start the preheating processing, and thereafter increases the rotation speed of the polygon motor to the exposure speed. Accordingly, this procedure contributes to reduction of unnecessary rotation of the polygon motor during the preheating processing of the fixing device, and this procedure contributes to reduce power consumption.

In the image forming apparatus according to an aspect of the present disclosure, the driving mechanism includes a fixing gear train configured to transmit the driving force of the main motor to the roller of the fixing device, and a drum gear train having a drum clutch. The drum clutch is switchable between a connected state in which the driving force of the main motor is transmittable to the photosensitive drum and a disconnected state in which the driving force of the main motor is not transmitted to the photosensitive drum.

According to the image forming apparatus having the above-described configuration, by switching the drum clutch between the connected state and the disconnected state by the controller, unnecessary rotation of the photosensitive drum may be reduced, and deterioration of the photosensitive drum may be reduced.

In the image forming apparatus according to an aspect of the present disclosure, a laser scanner is further provided that includes a polygon mirror and a polygon motor that rotates the polygon mirror. In a case where the temperature of the fixing device is higher than the given temperature at a time of receiving a start command for image forming processing, the controller starts rotation of the main motor after starting rotation of the polygon motor, and increases a rotation speed of the polygon motor to an exposure speed that is a rotation speed of the polygon motor suitable for exposing the photosensitive drum.

According to the image forming apparatus having the above-described configuration, in a case where the temperature of the fixing device is higher than the given temperature, time required for the preheating processing of the fixing device is shorter than time required for increasing the rotation speed of the polygon motor to the exposure speed, and thus the controller starts the rotation of the polygon motor before starting the rotation of the main motor. Accordingly, this procedure contributes to reduction of unnecessary rotation of the main motor during a period until the rotation speed of the polygon motor is increased to the exposure speed, and this procedure contributes to reduction of power consumption.

The image forming apparatus according to an aspect of the present disclosure further includes: a first tray that supports the sheet; a first pickup roller that picks up the sheet in the first tray; a first feeding clutch that switches between a connected state in which the driving force of the main motor is transmittable to the first pickup roller and a disconnected state in which the driving force of the main motor is not transmitted; a second tray that supports the sheet; a second pickup roller that picks up the sheet in the second tray; and a second feeding clutch that switches between a connected state in which the driving force of the main motor is transmittable to the second pickup roller and a disconnected state in which the driving force of the main motor is not transmitted. The first tray and the second tray are disposed at positions where a distance from the second pickup roller to the sheet sensor is longer than a distance from the first pickup roller to the sheet sensor.

In a case where the sheet is transmitted from the first tray, the controller switches the drum clutch to the connected state at a timing when a first standby time elapses since the first feeding clutch is set to the connected state. In a case where the sheet is transmitted from the second tray, the controller switches the drum clutch to the connected state at a timing when a second standby time longer than the first standby time elapses since the second feeding clutch is set to the connected state.

According to the image forming apparatus having the above-described configuration, as a conveyance distance of the sheet from each pickup roller to the sheet sensor increases, the timing at which the drum clutch is switched to the connected state is made later, so that unnecessary rotation of the photosensitive drum may be effectively omitted, and deterioration of the photosensitive drum may be satisfactorily reduced.

According to an aspect of the present disclosure, a fixing device and a photosensitive drum are rotatable at respective optimum rotation speeds and this contributes to reduction of deterioration of the photosensitive drum.

First Embodiment

Figure 1:
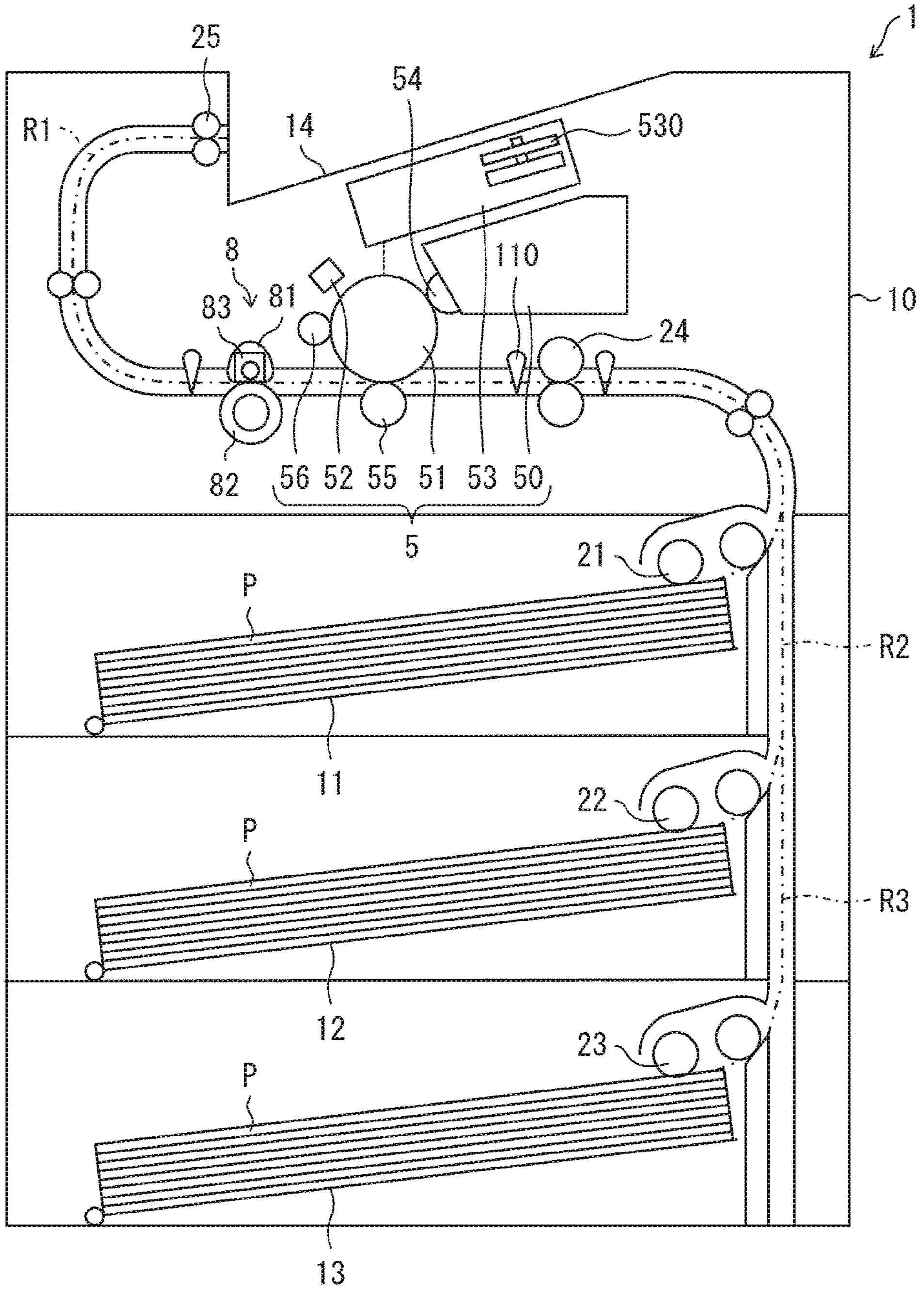
FIG. 1 is a schematic diagram illustrating an example of an internal configuration of an image forming apparatus.

Hereinafter, an image forming apparatus 1 according to a first embodiment of the present invention will be described with reference to FIGS. 1 to 6. FIG. 1 is a schematic diagram illustrating an example of an internal configuration of the image forming apparatus 1 according to the first embodiment. As illustrated in FIG. 1, the image forming apparatus 1 is, for example, a monochrome laser printer, and includes, in a housing 10, a first feed tray 11, a second feed tray 12, a third feed tray 13, a discharge tray 14, an image forming unit 5, and a fixing device 8.

The first feed tray 11 is detachably mounted in the housing 10 and supports a sheet P. The second feed tray 12 is disposed below the first feed tray 11 and supports the sheet P. The third feed tray 13 is disposed below the second feed tray 12 and supports the sheet P. The sheet P is, for example, plain paper. The number of feed trays is not limited to three, and may be changed as appropriate.

The image forming apparatus 1 includes a first conveyance path R1, a second conveyance path R2, and a third conveyance path R3. The first conveyance path R1 is a path from the first feed tray 11 to the discharge tray 14 via the image forming unit 5 and the fixing device 8. The second conveyance path R2 is a path from the second feed tray 12 to the first conveyance path R1. The third conveyance path R3 is a path from the third feed tray 13 to the second conveyance path R2.

The image forming apparatus 1 further includes pickup rollers 21, 22, and 23, a registration roller 24, and a discharge roller 25 as conveying units for conveying the sheet P along the conveyance paths R1, R2, and R3.

The pickup roller 21 is provided at the first feed tray 11, picks up the sheet Pin the first feed tray 11, and conveys the sheet P to the first conveyance path R1. The pickup roller 22 is provided at the second feed tray 12, picks up the sheet P in the second feed tray 12, and conveys the sheet P to the second conveyance path R2. The pickup roller 23 is provided at the third feed tray 13, picks up the sheet P in the third feed tray 13, and conveys the sheet P to the third conveyance path R3.

Figure 3:
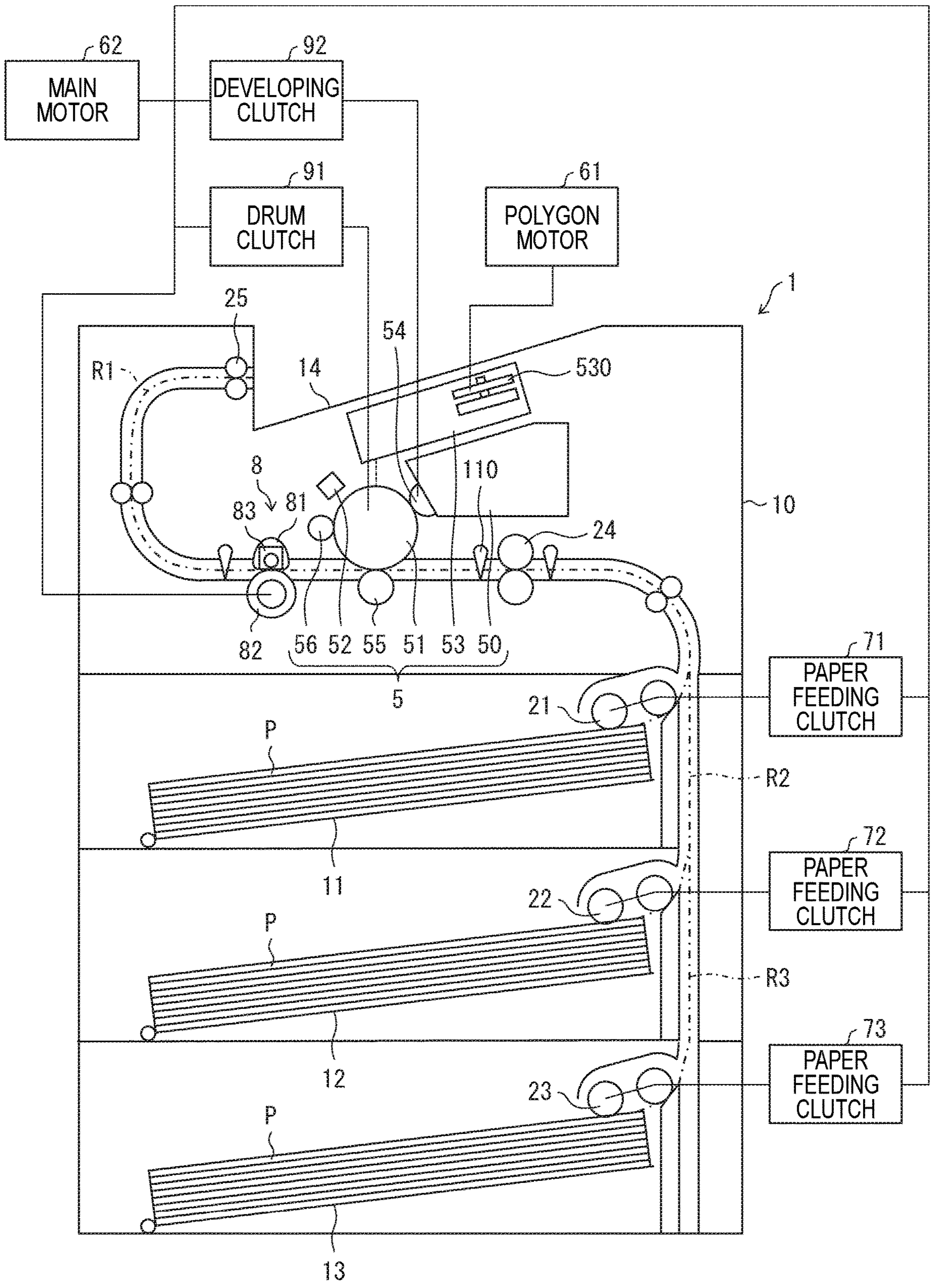
FIG. 3 is a schematic diagram of the image forming apparatus and a block diagram of main members.

Each of the pickup rollers 21, 22, and 23 is rotationally driven by a main motor 62. Specifically, as illustrated in FIG. 3, a driving force of the main motor 62 is transmitted to the pickup roller 21 via a feeding clutch 71. The driving force of the main motor 62 is transmitted to the pickup roller 22 via a feeding clutch 72. The driving force of the main motor 62 is transmitted to the pickup roller 23 via a feeding clutch 73.

The registration roller 24 and the discharge roller 25 are rotationally driven by the main motor 62. The registration roller 24 conveys the sheet P pulled out by the pickup rollers 21, 22, and 23 toward the image forming unit 5 in accordance with a forming operation and timing of a toner image in the image forming unit 5. The discharge roller 25 is rotationally driven by a discharge motor (not shown), and discharges the sheet P, on which an image is formed by the image forming unit 5, to the discharge tray 14.

As illustrated in FIG. 1, the image forming unit 5 includes a photosensitive drum 51, a charger 52, a laser scanner 53, a developing device 50, a transfer roller 55, and a cleaning roller 56, and forms a toner image on the sheet P.

The photosensitive drum 51 is rotationally driven by a driving force from the main motor 62. The charger 52 is, for example, a scorotron charger, and is disposed facing the photosensitive drum 51. When a given charging bias is applied to the charger 52, a surface of the photosensitive drum 51 is uniformly charged.

The laser scanner 53 is provided at an upper portion in the housing 10, includes a polygon mirror 530, a laser emitting unit (not shown), a lens, a reflecting mirror, and the like, and irradiates the photosensitive drum 51 with laser light to expose the photosensitive drum 51 to form an electrostatic latent image based on image data on the surface of the photosensitive drum 51.

The developing device 50 accommodates toner therein. The developing device 50 includes a developing roller 54. The developing roller 54 is rotationally driven by the main motor 62. When a given developing bias is applied to the developing roller 54, toner is supplied to the electrostatic latent image formed on the surface of the photosensitive drum 51. Accordingly, a toner image is formed on the surface of the photosensitive drum 51.

The transfer roller 55 is disposed facing the photosensitive drum 51. When a forward transfer bias is applied to the transfer roller 55, the toner image formed on the surface of the photosensitive drum 51 is electrically attracted, and the toner image is transferred to the sheet P.

The cleaning roller 56 is, for example, a sponge roller. By applying a given cleaning bias to the cleaning roller 56, the toner and the like remaining on the surface of the photosensitive drum 51 are removed from the photosensitive drum 51.

The fixing device 8 includes a heating unit 81, a roller 82, and a heater 83. The heating unit 81 includes a fixing belt and a nip plate (not illustrated). The fixing belt is a tubular member having heat resistance and flexibility and extending in an axial direction of the roller 82, and is provided so as to be rotatable about the axial direction. Both the heater 83 and the nip plate have substantially the same length as the fixing belt in the axial direction, and are disposed in a space on an inner circumferential side of the fixing belt.

When the heating unit 81 and the roller 82 are pressed against each other, a fixing nip is formed between the heating unit 81 and the roller 82. The heater 83 includes, for example, a halogen heater, and heats the heating unit 81. The fixing device 8 fixes the toner image formed on the sheet P to the sheet P by conveying the sheet P on which the toner image is formed while heating the sheet P at the fixing nip.

The fixing belt and the nip plate of the heating unit 81 are lubricated by grease so as to slide smoothly with respect to each other. The grease is adjusted to have an optimum viscosity when a temperature of the fixing device 8 is equal to or higher than a given temperature (for example, 150° C.). When the temperature of the fixing device 8 is lower than the given temperature, the viscosity of the grease is increased, and the fixing belt and the nip plate are difficult to slide with respect to each other. Therefore, until the temperature of the fixing device 8 reaches the given temperature, it is necessary to rotate the roller 82 at a slower speed than when fixing the toner image formed on the sheet P to the sheet P so as to soften the grease.

[Electrical Configuration of Image Forming Apparatus]

Figure 2:
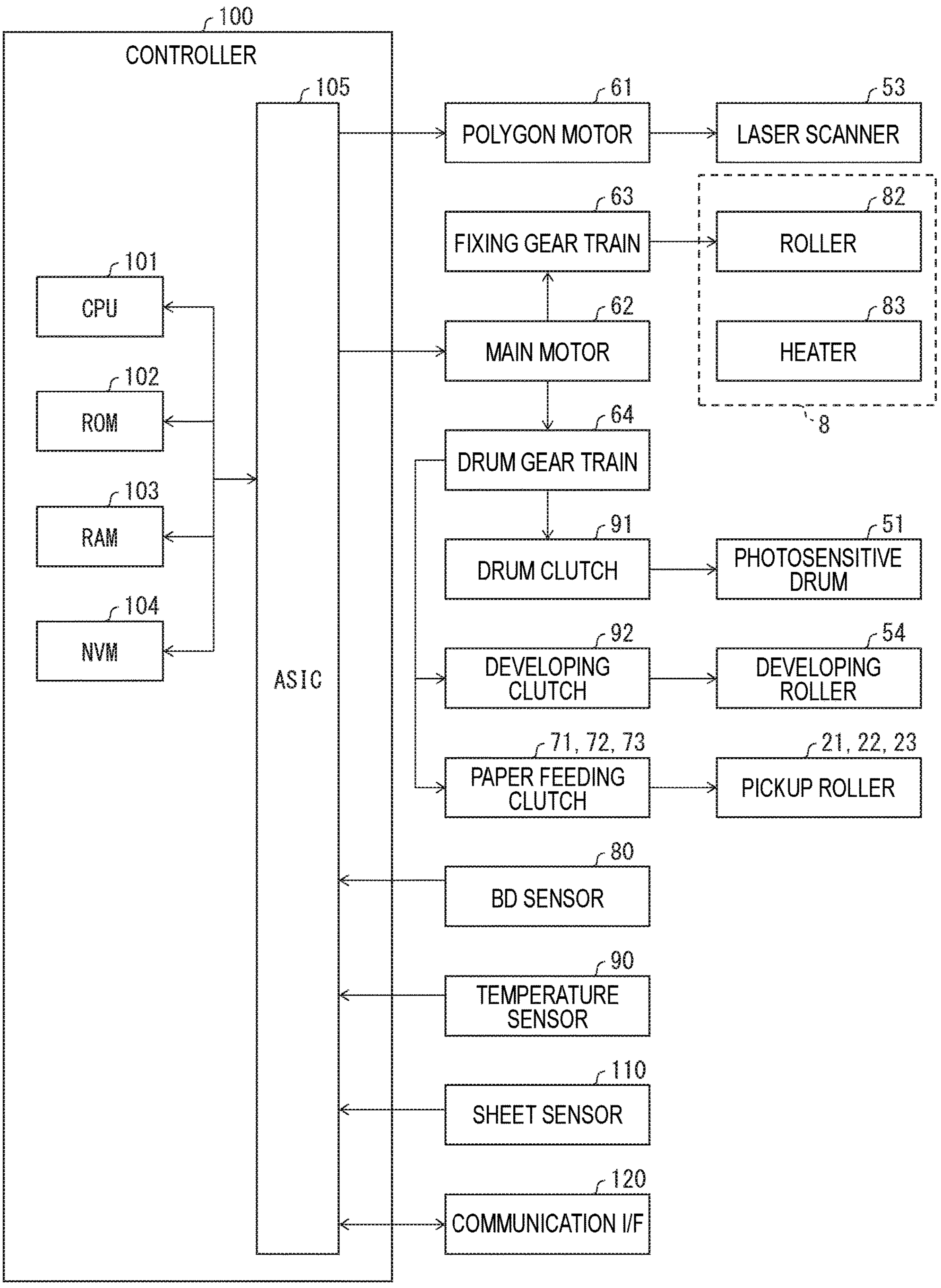
FIG. 2 is a block diagram illustrating an electrical configuration of the image forming apparatus.

FIG. 2 is a block diagram illustrating an electrical configuration of the image forming apparatus 1 according to the first embodiment. As illustrated in FIG. 2, a controller 100 includes a central processing unit (CPU) 101, a read only memory (ROM) 102, a random access memory (RAM) 103, a non-volatile memory (NVM) 104, and an ASIC 105, which are connected by an internal bus.

The controller 100 performs overall control of each unit of the image forming apparatus 1. The ROM 102 stores various control programs for controlling the image forming apparatus 1, various settings, and the like. The RAM 103 is used as a work area in which the various control programs are read and a storage area in which image data is temporarily stored.

The NVM 104 stores in advance various types of data such as programs for controlling application of various biases shown in FIG. 6, set values of the various biases, and a printing speed and an exposure speed to be described later.

A polygon motor 61, the main motor 62, a BD sensor 80, a temperature sensor 90, a sheet sensor 110, and a communication interface (I/F) 120 are electrically connected to the ASIC 105.

The controller 100 controls driving of the laser scanner 53 by driving the polygon motor 61. Further, the controller 100 controls driving of the fixing device 8, the photosensitive drum 51, the developing roller 54, the pickup rollers 21, 22 and 23, and the like by driving the main motor 62.

When the BD sensor 80 detects laser light emitted from the laser emitting unit, the BD sensor 80 outputs a BD signal to the controller 100. The BD sensor 80 is disposed at a position where the laser light reflected by a mirror surface of the polygon mirror 530 is incident when an angle of the mirror surface with respect to an emission direction of the laser light is a specific angle.

The temperature sensor 90 is disposed in the heating unit 81 and is used to estimate a temperature of the fixing nip. The temperature sensor 90 outputs a signal corresponding to the temperature of the fixing nip to the controller 100.

The sheet sensor 110 is a sensor that is disposed between the registration roller 24 and the photosensitive drum 51 in the first conveyance path R and detects passage of the sheet P. As the sheet sensor 110, a sensor having an actuator that swings when the sheet P comes into contact with the actuator, an optical sensor, or the like may be used. The sheet sensor 110 outputs an ON signal in a state where the sheet P is passing, and outputs an OFF signal in a state where the sheet P is not passing. A detection signal from the sheet sensor 110 is output to the controller 100.

The communication I/F 120 is connected to a network such as a LAN, and enables connection to an external device in which a driver for the image forming apparatus 1 is incorporated. The image forming apparatus 1 may receive a start command for image forming processing via the communication I/F 120.

[Driving Mechanism]

FIG. 3 is a schematic diagram of the image forming apparatus 1 and a block diagram of main members thereof. As illustrated in FIG. 3, the driving force of the main motor 62 is transmitted to the photosensitive drum 51 via a drum clutch 91, and is transmitted to the developing roller 54 via a developing clutch 92. The drum clutch 91 is, for example, an electromagnetic clutch. The drum clutch 91 may be any configuration that may be controlled by the controller 100, and may be a planetary clutch, a friction clutch, a dog clutch, or the like.

As illustrated in FIG. 2, the image forming apparatus 1 includes a fixing gear train 63 and a drum gear train 64. The fixing gear train 63 transmits the driving force of the main motor 62 to the roller 82 of the fixing device 8. The drum clutch 91 is disposed between the drum gear train 64 and the photosensitive drum 51. The drum clutch 91 switches between a connected state in which the driving force of the main motor 62 is transmittable to the photosensitive drum 51 and a disconnected state in which the driving force of the main motor 62 is not transmitted to the photosensitive drum 51.

The driving mechanism including the fixing gear train 63 and the drum gear train 64 has a connected state and a disconnected state. In the connected state, the driving force of the main motor 62 is transmitted to both the roller 82 and the photosensitive drum 51. In the disconnected state, the driving force of the main motor 62 is transmitted to the roller 82, but is not transmitted to the photosensitive drum 51.

The main motor 62 is connected to the pickup rollers 21, 22, and 23 via the feeding clutches 71, 72, and 73 respectively. The feeding clutch 71 also has a connected state in which the driving force of the main motor 62 is transmittable to the pickup roller 21 and a disconnected state in which the driving force of the main motor 62 is not transmitted to the pickup roller 21. The feeding clutch 72 has a connected state in which the driving force of the main motor 62 is transmittable to the pickup roller 22 and a disconnected state in which the driving force of the main motor 62 is not transmitted to the pickup roller 22. The feeding clutch 73 has a connected state in which the driving force of the main motor 62 is transmittable to the pickup roller 23 and a disconnected state in which the driving force of the main motor 62 is not transmitted to the pickup roller 23.

[Flow of Print Preparation Operation Performed by Controller]

Figure 4:
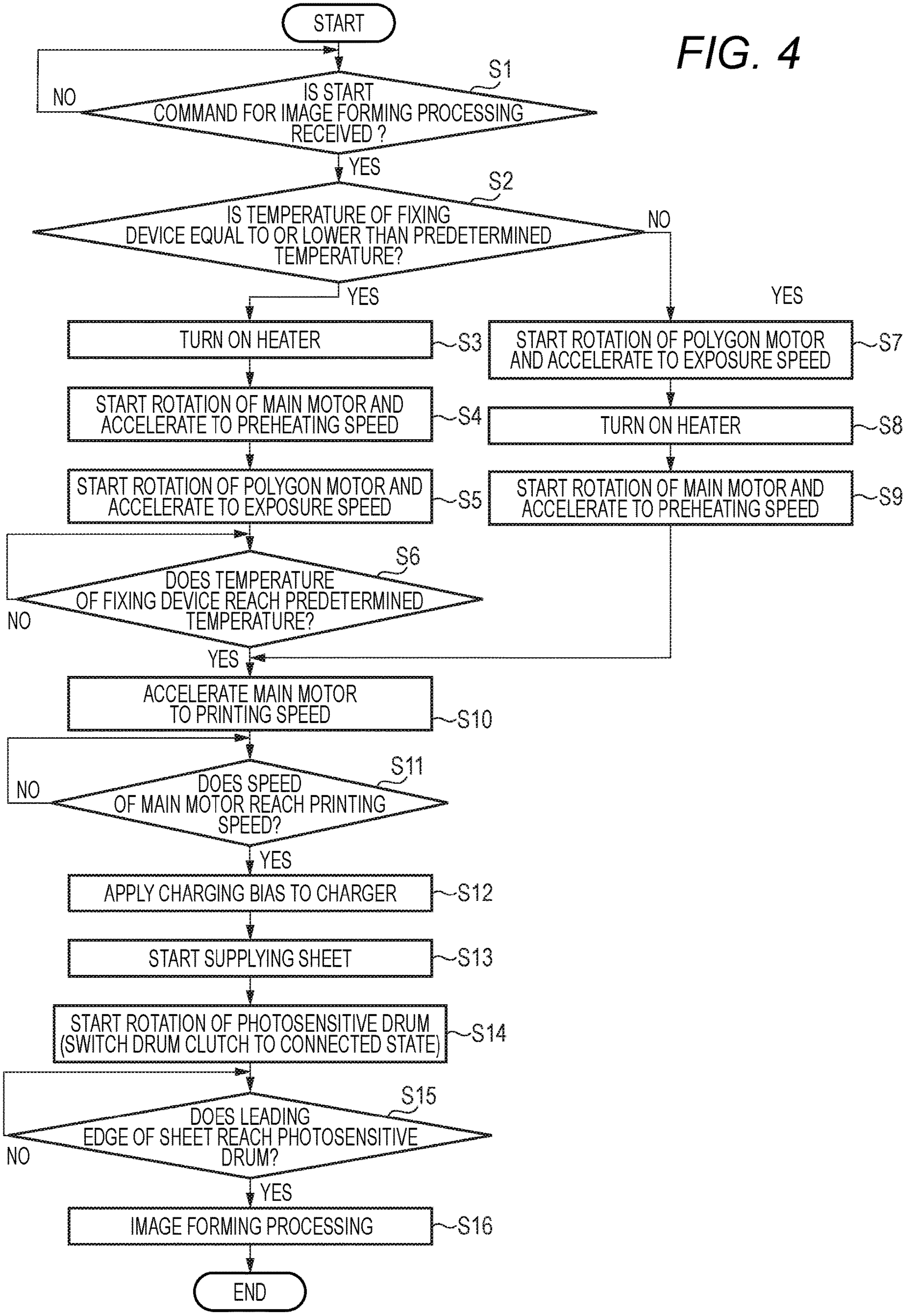
FIG. 4 is a flowchart illustrating a flow of control at the time of printing of the image forming apparatus.
Figure 5:
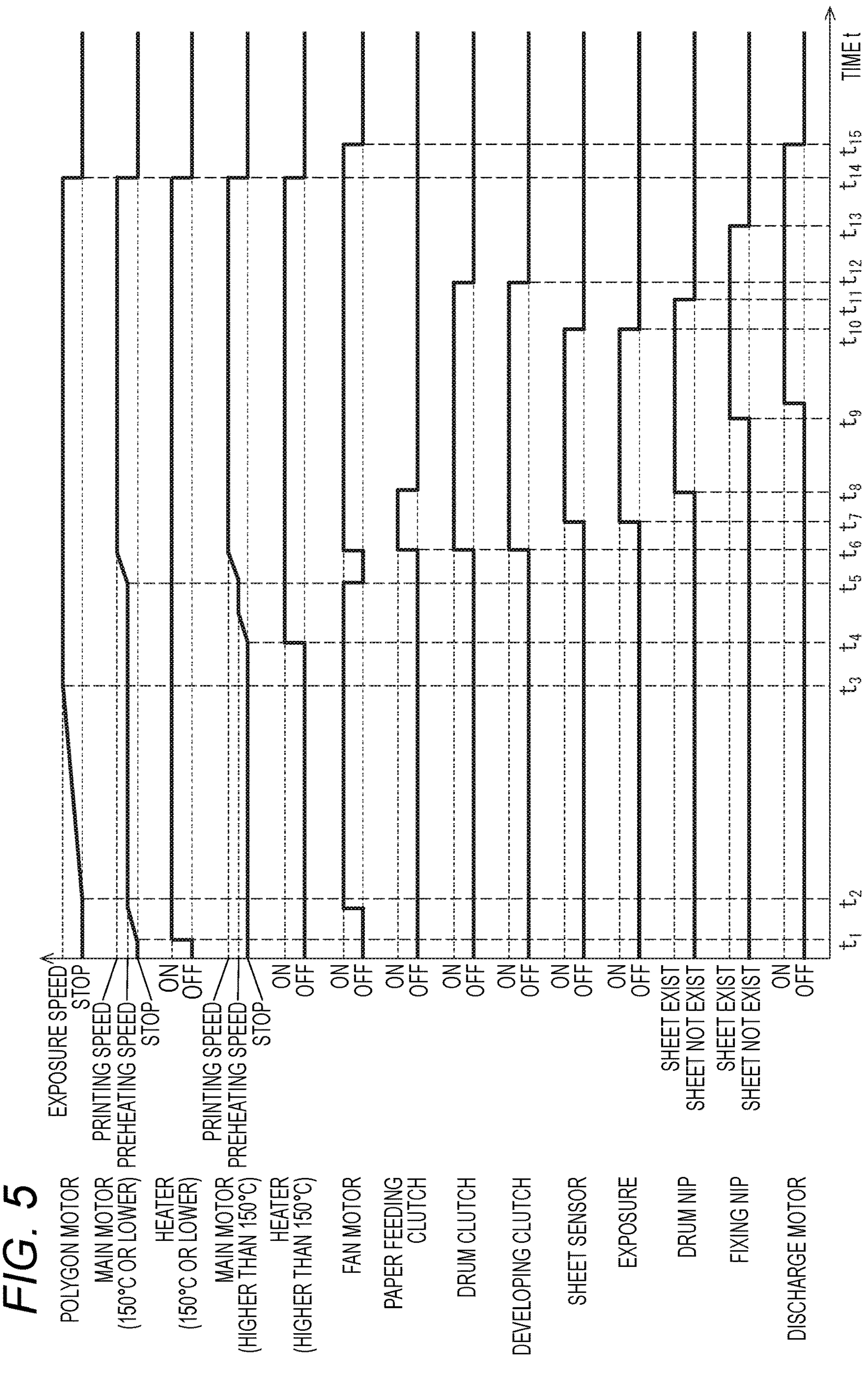
FIG. 5 is a timing chart illustrating an operation of each unit of the image forming apparatus.

Next, a flow of a print preparation operation performed by the controller 100 will be described with reference to FIGS. 4 and 5. FIG. 4 is a flowchart illustrating a flow of control at the time of printing of the image forming apparatus 1. FIG. 5 is a timing chart illustrating an operation of each unit of the image forming apparatus 1.

First, in the flowchart shown in FIG. 4, the controller 100 determines whether a start command for image forming processing, that is, a print job, is received through the communication I/F 120 (S1). When a start command for image forming processing is not received (S1: NO), the controller 100 returns to S1, and when a start command for image forming processing is received (S1: YES), the controller 100 determines whether a temperature of the fixing device 8 is equal to or lower than a given temperature (S2). Here, the given temperature is set to, for example, about 150° C.

In a case where the temperature of the fixing device 8 is equal to or lower than the given temperature (S2: YES), the controller 100 starts preheating processing of preheating the fixing device 8 by driving the main motor 62 at t1 in FIG. 5.

Specifically, the controller 100 sets the drum clutch 91 to the disconnected state and turns on the heater 83 (S3). Then, the controller 100 starts driving the main motor 62, accelerates the main motor 62 to a preheating speed (S4), and rotates the roller 82 in a state where rotation of the photosensitive drum 51 is stopped. The preheating speed is a rotation speed of the main motor 62 suitable for preheating the fixing device 8.

After S4, the controller 100 starts driving the polygon motor 61 at t2 in FIG. 5, and increases a rotation speed of the polygon motor 61 to an exposure speed (S5). The exposure speed is a rotation speed of the polygon motor 61 suitable for exposing the photosensitive drum 51. Thereafter, while the temperature of the fixing device 8 does not reach the given temperature (S6: NO), the controller 100 repeats S6 and stands by.

After S6, the controller 100 executes acceleration processing in S10. In the acceleration processing, the rotation speed of the main motor 62 is accelerated to a printing speed that is a rotation speed higher than the preheating speed while the drum clutch 91 of the driving mechanism is maintained in the disconnected state. Here, the printing speed is a rotation speed of the main motor 62 suitable for performing the image forming processing on the sheet P.

On the other hand, in a case where the temperature of the fixing device 8 is not equal to or lower than the given temperature (S2: NO), that is, in a case where the temperature of the fixing device 8 is higher than the given temperature, the controller 100 starts driving the polygon motor 61 and increases the rotation speed of the polygon motor 61 to the exposure speed (S7). Then, the controller 100 turns on the heater 83 to start heating the fixing device 8 (S8), and starts driving the main motor 62 to accelerate the main motor 62 to the preheating speed (S9).

After S9, the controller 100 executes processing of S10 to S16 as in the case where the temperature of the fixing device 8 is equal to or lower than the given temperature.

Here, application of a charging bias to the charger 52 in S12 will be described in detail with reference to FIG. 6. FIG. 6 is a timing chart illustrating control of each bias of the image forming apparatus 1. As illustrated in FIG. 6, at t21 in FIG. 6, the controller 100 causes a charging bias application unit (not illustrated) to apply a first charging bias to the charger 52.

Figure 6:
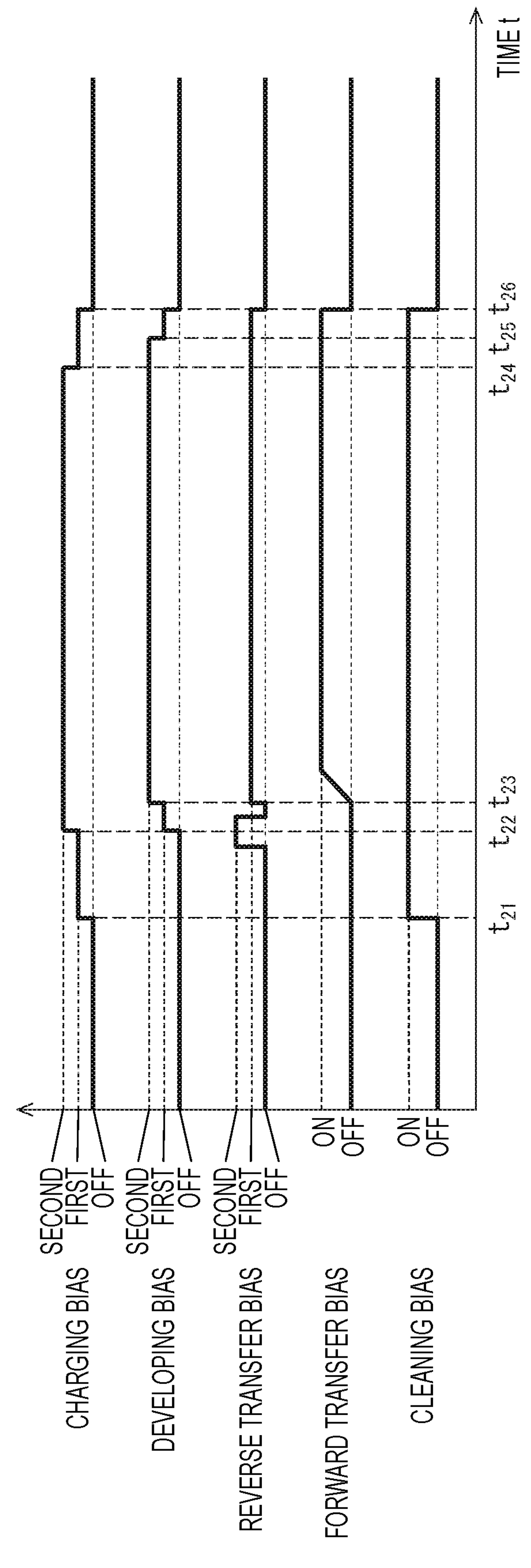
FIG. 6 is a timing chart illustrating control of each bias of the image forming apparatus.

Thereafter, at t22 in FIG. 6, the controller 100 applies a second charging bias having an absolute value larger than that of the first charging bias. At t21 in FIG. 6, the controller 100 causes a cleaning bias application unit (not illustrated) to apply a given cleaning bias to the cleaning roller 56.

Referring back to FIG. 4, after S12, at t6 in FIG. 5, the controller 100 sets the feeding clutch 71 to the connected state and rotates the pickup roller 21 to start feeding the sheet P from the first feed tray 11 to the first conveyance path R1 (S13). In S13, the controller 100 may supply the sheet P from the second feed tray 12 or the third feed tray 13 to the conveyance paths R1, R2, and R3.

After S13, the controller 100 starts the rotation of the photosensitive drum 51 (S14). Specifically, in S14, the controller 100 switches the drum clutch 91 to the connected state, and executes photosensitive drum driving start processing of starting driving both the roller 82 of the fixing device 8 and the photosensitive drum 51. In addition, the controller 100 sets the developing clutch 92 to a connected state to drive the developing roller 54. The drum clutch 91 and the developing clutch 92 are switched to a disconnected state at t12 in FIG. 5.

After S14, the controller 100 applies a high voltage to the developing roller 54 and the transfer roller 55. Specifically, at t22 in FIG. 6, the controller 100 causes a developing bias application unit (not illustrated) to apply a first developing bias, which is a high voltage, to the developing roller 54. Thereafter, at t23 in FIG. 6, the controller 100 applies a second developing bias having an absolute value larger than that of the first developing bias.

At t23 in FIG. 6, the controller 100 causes a transfer bias application unit (not illustrated) to apply a forward transfer bias of, for example, −0.6 kV to −2.8 kV to the transfer roller 55. Accordingly, a state is established in which a toner image may be transferred from the photosensitive drum 51 to the sheet P. Further, the controller 100 applies a given reverse transfer bias to the transfer roller 55. Accordingly, when transferring the toner image to the sheet P, influence of a current flowing into the transfer bias application unit side through the transfer roller 55 in contact with the photosensitive drum 51 may be eliminated, and the transfer bias application unit may be normally operated.

Next, in a case where the sheet sensor 110 is turned on by a leading edge of the sheet P passing through the sheet sensor 110 at t7 in FIG. 5, the controller 100 causes the laser scanner 53 to start exposure and continues exposure until t10 in FIG. 5.

Subsequently, the controller 100 determines whether the leading edge of the sheet P reaches the photosensitive drum 51 (S15). In a case where the leading edge of the sheet P does not reach the photosensitive drum 51 (S15: NO), the controller 100 repeats S15, and in a case where the leading edge of the sheet P reaches the photosensitive drum 51 at t8 in FIG. 5 (S15: YES), the controller 100 executes the image forming processing of forming an image on the sheet P by the image forming unit 5 (S16).

Specifically, during a period from t8 to t11 in FIG. 5, the controller 100 rotates the photosensitive drum 51 and the transfer roller 55 so that the sheet P passes through a drum nip formed between the photosensitive drum 51 and the transfer roller 55, thereby transferring a toner image on the surface of the photosensitive drum 51 to the sheet P.

Then, the controller 100 drives the fixing device 8 to convey the sheet P, on which the toner image is formed, while heating the sheet P at the fixing nip during a period from t9 to t13 in FIG. 5, thereby fixing the toner image formed on the sheet P to the sheet P. Thereafter, in a case where the sheet P on which the toner image is thermally fixed is discharged onto the discharge tray 14 by the discharge roller 25, the controller 100 stops the rotation of a main motor 62 and the polygon motor 61 at t14 in FIG. 5, and then stops the rotation of the fan motor (not illustrated) and the discharge motor at t15 in FIG. 5. In this way, the print processing shown in FIG. 4 ends.

Effects of First Embodiment

In the image forming apparatus 1 according to the present embodiment described above, the controller 100 sets the drum clutch 91 to the disconnected state and drives the main motor 62 during the execution of the preheating processing S3 and the acceleration processing S10, so that unnecessary rotation of the photosensitive drum 51 may be reduced. Accordingly, the fixing device 8 and the photosensitive drum 51 may be rotated at respective optimum rotation speeds, and deterioration of the photosensitive drum 51 may be reduced.

In a case where the start command for image forming processing is received (S1: YES) and the temperature of the fixing device 8 detected by the temperature sensor 90 is equal to or lower than the given temperature (for example, 150° C.) (S2: YES), the controller 100 starts the rotation of the main motor 62 in S4 and then starts the rotation of the polygon motor 61 to increase the rotation speed of the polygon motor 61 to the exposure speed (S5).

That is, in a case where a time required for the preheating processing of the fixing device 8, that is, a term from t1 to t5 in FIG. 5, is longer than a time required for increasing the rotation speed of the polygon motor 61 to the exposure speed, that is, a term from t2 to t3 in FIG. 5, the driving of the main motor 62 is started at t1 in FIG. 5 before the timing (t2 in FIG. 5) at which the driving of the polygon motor 61 is started. Accordingly, it is possible to reduce unnecessary rotation of the polygon motor during the preheating processing of the fixing device 8, and it is possible to reduce power consumption.

In a case where the temperature of the fixing device 8 is higher than the given temperature (for example, 150° C.) (S2: NO), the time required for the preheating processing of the fixing device 8, that is, a term from t4 to t5 in FIG. 5, is shorter than the time required for increasing the rotation speed of the polygon motor 61 to the exposure speed, that is, a term from t2 to t3 in FIG. 5, and thus the controller 100 starts the rotation of the polygon motor 61 before starting the rotation of the main motor 62. Accordingly, this procedure contributes to reduction of unnecessary rotation of the main motor 62 during a period until the rotation speed of the polygon motor 61 is increased to the exposure speed, and this procedure contributes to reduction of power consumption.

Second Embodiment

Figure 7:
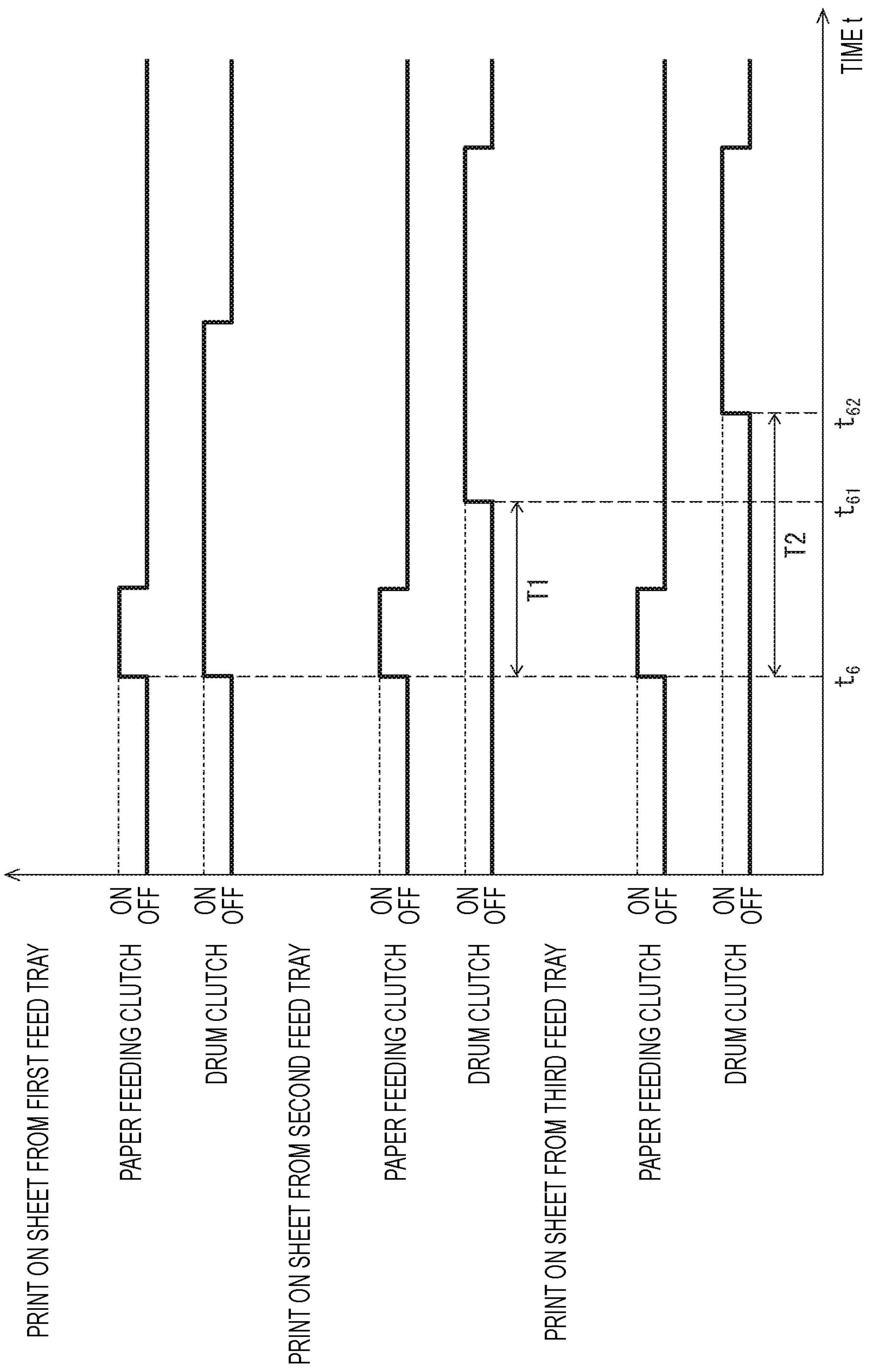
FIG. 7 is a timing chart illustrating operation states of feeding clutches and drum clutches of an image forming apparatus.

Next, the image forming apparatus 1 according to a second embodiment of the present disclosure will be described with reference to FIGS. 1, 3, 4, and 7. FIG. 7 is a timing chart illustrating operation states of the feeding clutches 71, 72, and 73 and the drum clutch 91 of the image forming apparatus 1 according to the second embodiment. For convenience of description, members having the same functions as those described in the first embodiment are denoted by the same reference numerals, and a description thereof will not be repeated.

The second embodiment is different from the first embodiment in that, when performing printing on the sheets P of the first feed tray 11, the second feed tray 12, and the third feed tray 13, the controller 100 sets the drum clutch 91 to be in a connected state at different timings as illustrated in FIG. 7.

A schematic configuration of the image forming apparatus 1 according to the second embodiment is the same as that of the first embodiment. That is, as illustrated in FIG. 1, the image forming apparatus 1 includes, in the housing 10, the first feed tray 11, the second feed tray 12 as an example of a first tray, the third feed tray 13 as an example of a second tray, the discharge tray 14, the image forming unit 5, and the fixing device 8.

The first feed tray 11 is provided with the pickup roller 21. The second feed tray 12 is provided with the pickup roller 22 that is an example of a first pickup roller. The third feed tray 13 is provided with the pickup roller 23 that is an example of a second pickup roller.

The second feed tray 12 and the third feed tray 13 are arranged such that a conveyance distance of the sheet P from the pickup roller 23 to the sheet sensor 110 is longer than a conveyance distance of the sheet P from the pickup roller 22 to the sheet sensor 110.

As illustrated in FIG. 3, a driving force of the main motor 62 is transmitted to the pickup roller 21 via the feeding clutch 71. The driving force of the main motor 62 is transmitted to the pickup roller 22 via the feeding clutch 72 that is an example of a first feeding clutch. The driving force of the main motor 62 is transmitted to the pickup roller 23 via the feeding clutch 73 that is an example of a second feeding clutch.

In the flowchart illustrated in FIG. 4, when the sheet P is conveyed from the second feed tray 12 in S13, the controller 100 switches the drum clutch 91 to the connected state at t61 in FIG. 7, that is, at a timing when first standby time T1 elapses since the feeding clutch 72 is set to a connected state at t6 in FIG. 7.

On the other hand, when the sheet P is conveyed from the third feed tray 13 in S13 of FIG. 4, the controller 100 switches the drum clutch 91 to the connected state at t62 of FIG. 7, that is, at a timing when second standby time T2 elapses since the feeding clutch 73 is set to a connected state at t6 of FIG. 7. The second standby time T2 is set to be longer than the first standby time T1. That is, in the conveyance paths R1, R2, and R3, as the conveyance distance of the sheet P from the pickup rollers 22 and 23 to the photosensitive drum 51 increases, the standby time from when the feeding clutch 73 is set to the connected state to when the drum clutch 91 is switched to the connected state is set to be longer.

In this way, as time of conveying the sheet P increases, the timing at which the drum clutch 91 is set to the connected state to drive the photosensitive drum 51 is made later, so that it is possible to effectively omit unnecessary rotation of the photosensitive drum 51 and to favorably reduce deterioration of the photosensitive drum 51.

OTHER EMBODIMENTS

Although the image forming apparatus 1 according to the first and second embodiments is a monochrome laser printer, the image forming apparatus 1 is not limited thereto, and may be, for example, a multi-function peripheral (MFP) having a printer function, a scanner function, and the like.

Although the sheet P is assumed to be plain paper, the type of the sheet P is not limited thereto, and may be thick paper or thin paper, for example. Further, a value of each bias shown in FIG. 6 may vary depending on the type of the sheet P.

In addition, each step of the processing of FIG. 4 executed by the controller 100 is an example, and contents of a part of the processing may be changed or an order of the part of the processing may be changed.

[Example of Implementation by Software]

The controller 100 of the image forming apparatus 1 may be implemented with a logic circuit (hardware) formed in an integrated circuit (IC chip) or the like, or may be implemented by software.

In the latter case, the image forming apparatus 1 includes a computer that executes a command of a program that is software for implementing functions. The computer includes, for example, one or more processors and a computer-readable recording medium storing the program. In the computer, the processor reads the program from the recording medium and executes the program, thereby achieving the object of the present invention. As the processor, for example, a central processing unit (CPU) can be used. Examples of the recording medium include "a non-transitory tangible medium" such as a read only memory (ROM), a tape, a disk, a card, a semiconductor memory, and a programmable logic circuit. In addition, a random access memory (RAM) or the like in which the program is loaded may be further provided. The program may be supplied to the computer via any transmission medium (such as a communication network or a broadcast wave) capable of transmitting the program. An aspect of the present invention can also be implemented in a form of a data signal in which the program is embodied by electronic transmission and which is embedded in a carrier wave.

The present invention is not limited to the above-described embodiments, and various modifications can be made within the scope of the claims. Embodiments obtained by appropriately combining the technical means disclosed in the different embodiments also fall within the technical scope of the present invention.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

What is claimed is:

1. An image forming apparatus configured to execute image forming processing of forming an image on a sheet, comprising:

a photosensitive drum;

a fixing device including a heater and a roller;

a main motor configured to generate a driving force;

a driving mechanism having a connected state in which the driving force is transmittable to both the roller and the photosensitive drum, and a disconnected state in which the driving force is transmittable to the roller but is not transmitted to the photosensitive drum;

a temperature sensor configured to detect a temperature of the fixing device; and a controller, wherein in a case where the image forming processing is started, the controller sets the driving mechanism into the disconnected state, rotates the main motor at a preheating speed, and executes preheating processing in which the fixing device is heated by the heater, wherein in a case where the temperature of the fixing device detected by the temperature sensor is equal to or higher than a given temperature after execution of the preheating processing, the controller executes acceleration processing in which the rotation speed of the main motor is changed to a printing speed that is higher than the preheating speed while maintaining the disconnected state of the driving mechanism, and wherein in a case where the rotation speed of the main motor reaches the printing speed after execution of the acceleration processing, the controller changes a state of the driving mechanism from the disconnected state into the connected state, and executes photosensitive drum driving start processing in which driving of both the roller of the fixing device and the photosensitive drum is started.

2. The image forming apparatus according to claim 1, further comprising:

a laser scanner including a polygon mirror and a polygon motor that is configured to rotate the polygon mirror, wherein in a case where the temperature of the fixing device is equal to or lower than the given temperature at a time of receiving a start command for image forming processing, the controller increases a rotation speed of the polygon motor to an exposure speed that is a rotation speed of the polygon motor suitable for exposing the photosensitive drum after starting rotation of the main motor.

3. The image forming apparatus according to claim 1, wherein the driving mechanism includes a fixing gear train configured to transmit the driving force of the main motor to the roller of the fixing device, and a drum gear train having a drum clutch, wherein the drum clutch has a connected state in which the driving force of the main motor is transmittable to the photosensitive drum and a disconnected state in which the driving force of the main motor is not transmitted to the photosensitive drum.

4. The image forming apparatus according to claim 1, further comprising:

a laser scanner including a polygon mirror and a polygon motor that is configured to rotate the polygon mirror, wherein in a case where the temperature of the fixing device is higher than the given temperature at a time of receiving a start command for image forming processing, the controller starts rotation of the main motor after starting rotation of the polygon motor, and increases a rotation speed of the polygon motor to an exposure speed that is a rotation speed of the polygon motor suitable for exposing the photosensitive drum.

5. The image forming apparatus according to claim 1, further comprising:

a first tray configured to support a first sheet;

a first pickup roller configured to picking up the first sheet in the first tray;

a first feeding clutch having a connected state in which the driving force of the main motor is transmittable to the first pickup roller and a disconnected state in which the driving force is not transmitted to the first pickup roller;

a second tray configured to support a second sheet;

a second pickup roller picking up the second sheet in the second tray;

a second feeding clutch having a connected state in which the driving force of the main motor is transmittable to the second pickup roller and a disconnected state in which the driving force is not transmitted to the second pickup roller; and a sheet sensor configured to detect that the first sheet or the second sheet passes through a given position upstream of the photosensitive drum in a sheet conveying direction, wherein the first tray and the second tray are disposed at positions where a distance from the second pickup roller to the sheet sensor is longer than a distance from the first pickup roller to the sheet sensor, and wherein in a case where the first sheet is conveyed from the first tray, the controller sets the driving mechanism into the connected state at a timing when a first standby time elapses since the first feeding clutch is set to the connected state, and wherein in a case where the second sheet is conveyed from the second tray, the controller set the driving mechanism into the connected state at a timing when a second standby time longer than the first standby time elapses since the second feeding clutch is set to the connected state.

* * * * *